United States Patent [19]
Wakefield

[11] Patent Number: 5,889,381
[45] Date of Patent: Mar. 30, 1999

[54] MEANS OF COMMUNICATION BETWEEN A BATTERY PACK AND A BATTERY POWERED DEVICE

[75] Inventor: Ivan Nelson Wakefield, Cary, N.C.

[73] Assignee: Ericsson, Inc., Research Triangle Park, N.C.

[21] Appl. No.: 818,246

[22] Filed: Mar. 14, 1997

[51] Int. Cl.⁶ ..................................................... H01M 10/46
[52] U.S. Cl. ............................................ 320/106; 320/114
[58] Field of Search ...................................... 320/106, 110, 320/112, 114, 126, 132, 101, 142, 147

[56] References Cited

U.S. PATENT DOCUMENTS

| | | |
|---|---|---|
| 4,463,341 | 7/1984 | Iwasaki . |
| 4,700,375 | 10/1987 | Reed . |
| 4,709,202 | 11/1987 | Koenck et al. . |
| 5,274,319 | 12/1993 | Kenner et al. . |
| 5,329,204 | 7/1994 | Ricca . |
| 5,371,453 | 12/1994 | Fernandez . |
| 5,420,493 | 5/1995 | Hargadon et al. . |
| 5,511,240 | 4/1996 | Nishiyama . |
| 5,534,765 | 7/1996 | Kreisinger et al. . |
| 5,539,298 | 7/1996 | Perkins et al. . |
| 5,572,110 | 11/1996 | Dunstan . |
| 5,589,756 | 12/1996 | Wilson et al. . |

FOREIGN PATENT DOCUMENTS

| | | |
|---|---|---|
| 0 688 125 A | 12/1995 | European Pat. Off. . |
| 2 250 891 A | 6/1992 | United Kingdom . |
| WO 96 28922 | 9/1996 | WIPO . |
| WO 97/03534 | 1/1997 | WIPO . |

Primary Examiner—Edward H. Tso
Attorney, Agent, or Firm—Jenkens & Gilchrist, P.C.

[57] ABSTRACT

An apparatus enabling communication and control between a battery powered device, such as a cellular telephone, and a battery pack through a two-pin interface between the battery pack and the battery powered device is disclosed. A battery powered device includes means for selectively switching a load across the two-pin interface for the device. By selectively switching the load across the terminal of the interface, a voltage varying signal is generated. The creation of the voltage varying signal is controlled in such a manner that alterations in the voltage represent a binary-encoded signal. The voltage changes representing the binary-encoded signal are detected within a battery pack interconnected with the battery powered device and used to provide instructions to a controller controlling an apparatus associated with the battery pack device, such as vibrator alarm.

24 Claims, 1 Drawing Sheet

MEANS OF COMMUNICATION BETWEEN A BATTERY PACK AND A BATTERY POWERED DEVICE

BACKGROUND OF THE INVENTION

1. Technical Field of the Invention

The present invention relates to interactions between a battery pack and a battery powered device, and more particularly, to communication between a battery pack and a battery powered device.

2. Description of Related Art

Many types of battery powered devices, such as cellular telephones, include removable battery packs enabling the recharging of one battery pack while another is plugged into the battery powered device to provide power thereto. The majority of the battery packs and battery powered devices are interconnected via a two-pin interface consisting of a positive terminal and a ground terminal. This allows current to flow between the battery pack and battery powered device and provide power to the battery powered device from cells within the battery pack.

Presently, if it is desired to incorporate extra features within a battery pack, the addition of extra contacts within the interface between the battery pack and the battery powered device are necessary. However, in some cases the necessary costs, additional space, or other limitations may prevent the addition of contacts to a battery pack or battery powered device even though the extra features are desired. Thus, some manner enabling the incorporation of additional features within an existing two-pin configuration would enable expansion of the functionalities that could be incorporated within battery packs and battery powered devices having the two-pin interface.

SUMMARY OF THE INVENTION

The present invention overcomes the foregoing and other problems with a system enabling communication between the battery pack and a battery powered device. Within a battery powered device, a load element is connected across the terminals of the interface enabling interconnection between the battery powered device and a battery pack. Connected in series with the load element is a switch controlled by a controller within the battery powered device. The controller actuates and deactuates the switch to selectively connect the load element across the terminals of the interface of the battery powered device. This causes the voltage across the terminals to vary generating a voltage varying signal at the interface terminals. The voltage varying signal is generated in a manner such that the voltage changes represent a binary-encoded signal.

Within the battery pack, a differential amplifier connected across the two-pins of the interface between the battery powered device and the battery pack detects the alterations in the voltage signal and provides an output to an analog to digital (A/D) converter. The A/D converter processes the received analog signal from the differential amplifier and generates a digital output representing the binary-encoded signal created by the controller of the battery powered device. A controller within the battery pack recognizes the binary-encoded signal and in response thereto actuates a device or functionality associated with the battery pack.

The battery pack also includes a load element connected across the terminals of the interface in series with a switch controlled by the controller of the battery pack. In the same manner as the controller and load element combination within the battery powered device, a voltage varying signal may be generated at the terminals of the battery pack which can be recognized by a differential amplifier and analog-to-digital converter combination within the battery powered device.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
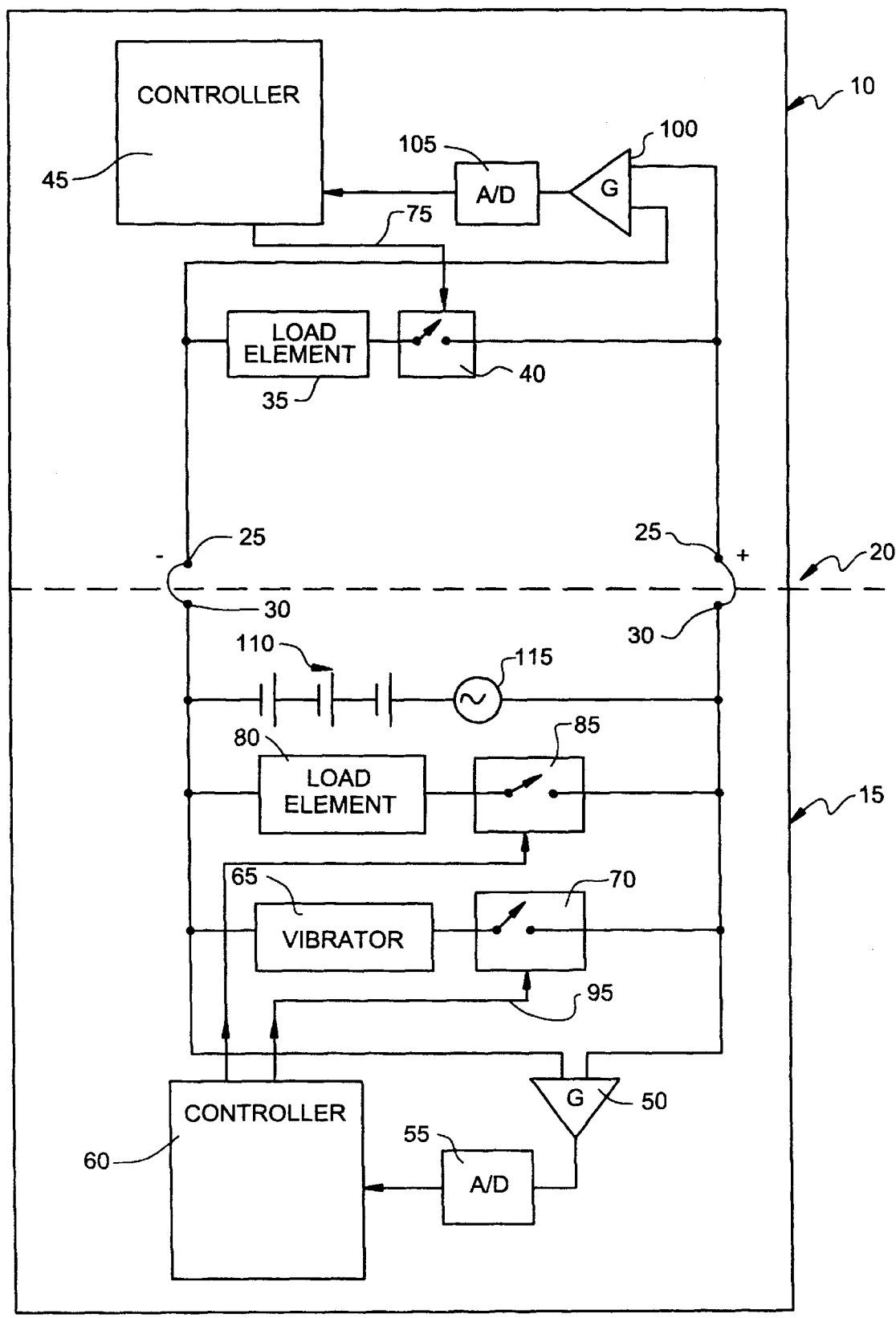
FIG. 1 is an illustration of one embodiment of the present invention.

Referring now to the drawings, and more particularly to FIG. 1, there is illustrated a functional block diagram of the present invention. A battery powered device 10 comprising, for example, a cellular telephone is electrically and physically attached to a battery pack 15 through a dual pin interface 20. Dual pin interface 20 consists of a pair of terminals 25 on the battery powered device 10 that interconnects both mechanically and electrically with a corresponding pair of terminals 30 on the battery pack 15.

Within the battery powered device 10, a load element 35 is connected across the terminals 25 of the battery powered device. The load element 35 comprises a relatively low resistance. In a preferred embodiment, the load element 35 of the battery powered device 10 is implemented by cycling the back lighting of the keypad display of a cellular telephone on and off. Connected in series with the load element 35 is a switch 40 controlled by a battery powered device controller 45. The controller 45 sends control signals to the switch 40 via control line 75 to selectively connect the load element 35 across terminals 25 of the battery powered device 10. By selectively connecting the load element 35 across the terminals 25 of the battery powered device 10, the voltage signal registering across the terminals is altered. The controller 45 will alter the voltage across the terminals 25 in such a manner that the increases and decreases in voltage caused by selectively switching the load element 35 across the terminals represent a binary-encoded signal.

The varying voltage signal representing the binary-encoded signal is received at the terminals 30 of the battery pack 15. Connected to the terminals 30 of the battery pack 15 are the inputs of a differential amplifier 50. The differential amplifier 50 amplifies the induced voltage changes across the terminals 30 and generates an analog signal indicative thereof. The analog signal from the differential amplifier 50 is supplied to an analog-to-digital converter 55 which digitizes the induced voltage signal for input into a battery pack controller 60.

The digitized induced voltage signal representing the binary-encoded signal is processed by the battery pack controller 60 and provides instructions for controlling a device associated with the battery pack 15. In the embodiment illustrated in FIG. 1, the device controlled by the controller 60 in response to the binary-encoded signal comprises a vibrator alarm 65. The vibrator alarm 65 is actuated and deactuated by activation switch 70 which is responsive to control signals from the battery pack controller 60 through control line 95.

Thus, if the battery powered device 10 wishes to actuate the vibrator alarm 65 within the battery pack 15, the battery powered device controller 45 would generate the proper control signals to switch 40 to selectively connect load element 35 across terminals 25 of the battery powered device. This would produce a binary-encoded signal which is detected by differential amplifier 50 and then digitized at analog-to-digital converter 55. Battery pack controller 60 interprets the digitized signals 55 and actuates or deactuates the vibrator alarm 65 by controlling switch 70.

While the present invention has been described with respect to the use of an vibrator alarm 65, it should be realized that the device controlled within the battery pack 15 may comprise a variety of devices capable of responding to instructions from a microprocessor controller. Thus, for example, an audio alarm, digital display, LED indicator, or any other type of peripheral component may be operated in this manner.

In a similar manner as described above, a battery pack 15 may send control information to the battery power device 10. A load element 80 connected across the terminals 30 of the battery pack 15 may be selectively switched across the terminals 30 of the battery pack utilizing a switch 85 responding to control signals from the battery pack controller 60 via control line 95. By selectively switching the load element across the terminals 30 of the battery pack 15, a voltage varying signal is created across the terminals wherein the changes in the voltage signal represent a binary-encoded information signal. The voltage varying signal is detected within the battery powered device 10 by a differential amplifier 100 having its inputs connected to the terminals 25 of the battery powered device. The analog output of the differential amplifier 100 is digitized by an analog-to-digital converter 105, and the digital signal is then processed by the battery powered device controller 45 to perform a requested procedure.

The battery pack 15 further includes a number of battery cells 110 connected in series across the terminals 30 of the battery pack for providing electrical power and a fuse 115 for disconnecting the battery pack in case of a short or other problem.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A system for communicating between a battery pack and a battery powered device connected through an interface having at least two terminals, comprising:

means within the battery powered device for selectively altering a voltage across the interface terminals between the battery pack and the battery powered device, the altered voltage across the interface terminals representing a binary-encoded signal; and means within the battery pack responsive to the binary-encoded signal for controlling a device associated with the battery pack.

2. The system of claim 1 wherein the means for selectively altering comprises:

a load element for altering the voltage across the interface terminals; and means for selectively connecting the load element across the interface terminals to selectively alter the voltage across the interface terminals.

3. The system of claim 2 wherein the means for selectively connecting comprises:

a controller for generating control signals to generate a desired binary-encoded signal; and a switch connected in series with the load element and responsive to the control signals.

4. The system of claim 1 wherein the means responsive to the binary-coded signal comprises:

means for detecting the binary-encoded signal; and a controller responsive to the binary-encoded signal for controlling the device associated with the battery pack.

5. The system of claim 1 wherein the means for detecting comprises:

a differential amplifier having inputs connected across the interface terminals for detecting the voltage changes across the interface terminals and generating an analog output indicative thereof; and an analog-to-digital converter for generating a digital representation of the binary-encoded signal from the analog signal.

6. The system of claim 1 further including second means within the battery pack for selectively altering a voltage across the interface terminals, the altered voltage across the interface terminals representing a binary-encoded signal.

7. The system of claim 6 wherein the second means for selectively altering comprises:

a load element for altering the voltage across the interface terminals; and means for selectively connecting the load element across the interface terminals to selectively alter the voltage across the interface terminals.

8. The system of claim 7 wherein the means for selectively connecting comprises:

a controller for generating control signals to generate a desired binary-encoded signal; and a switch connected in series with the load element and responsive to the control signals.

9. The system of claim 6 further including:

means for detecting the binary-encoded signals from the second means for selectively altering; and a controller responsive to the binary-encoded signals.

10. The system of claim 9 wherein the means for detecting comprises:

a differential amplifier having inputs connected across the interface terminals for detecting the voltage changes across the interface terminals and generating an analog output indicative thereof; and an analog-to-digital converter for generating a digital representation of the binary-encoded signal from the analog signal.

11. The system of claim 1 wherein the device associated with the battery pack comprises a vibrator alarm.

12. A system for communicating between a battery pack and a battery powered device connected by at least two interface terminals, comprising:

a load element connected across the interface terminals for altering the voltage across the interface terminals, the altered voltage across the interface terminals representing a binary-encoded signal;

means for selectively connecting the load element across the interface terminals;

means within the battery pack for detecting the binary-encoded signal; and a controller responsive to the binary-encoded signal for controlling a device associated with the battery pack.

13. The system of claim 12 wherein the means for selectively connecting comprises:
   a controller for generating control signals to generate a desired binary-encoded signal; and
   a switch connected in series with the load element and responsive to the control signals.

14. The system of claim 12 wherein the means for detecting comprises:
   a differential amplifier having inputs connected across the interface terminals for detecting the voltage changes across the interface terminals and generating an analog output indicative thereof; and
   an analog-to-digital converter for generating a digital representation of the binary-encoded signal from the analog signal.

15. The system of claim 12 further including second means within the battery pack for selectively altering a voltage across the interface terminals, the altered voltage across the interface terminals representing a binary-encoded signal.

16. The system of claim 15 wherein the second means for selectively altering comprises:
   a load element for altering the voltage across the interface; and
   means for selectively connecting the load element across the interface terminals to selectively alter the voltage across the interface terminals.

17. The system of claim 15 further including:
   means for detecting the binary-coded signals from the second means for selectively altering; and
   a controller responsive to the binary-coded signal.

18. The system of claim 12 wherein the device associated with the battery pack comprises a vibrator alarm.

19. A battery pack capable of communicating with a battery powered device through a dual pin interface comprising:
   means for detecting voltage changes across the dual pin interface, the voltage changes representing a binary-encoded signal;
   a device associated with the battery pack; and
   a controller responsive to the binary-encoded signal for controlling the device associated with the battery pack.

20. The system of claim 19 wherein the means for detecting comprises:
   a differential amplifier having inputs connected across the dual-pin interface for detecting the voltage changes across the dual-pin interface and generating an analog output indicative thereof; and
   an analog-to-digital converter for generating a digital representation of the binary-coded signal from the analog signal.

21. The system of claim 19 further including means for selectively altering the voltage across the dual pin interface.

22. The system of claim 21 wherein the means for selectively altering comprises:
   a load element for altering the voltage across the dual-pin interface terminals; and
   means for selectively connecting the load element across the dual-pin interface to selectively alter the voltage across the dual-pin interface.

23. The system of claim 22 wherein the means for selectively connecting comprises:
   a controller for generating control signals to generate a desired binary-encoded signal; and
   a switch connected in series with the load element and responsive to the control signals.

24. A battery powered device capable of communicating with a battery pack through a dual pin interface, comprising:
   a load element for altering the voltage across the dual pin interface, the voltage changes representing a binary-encoded signal;
   a controller for generating control signals to generate the desired binary-encoded signal; and
   a switch connected in series with the load element and responsive to the control signal.

* * * * *